Nov. 3, 1936.  E. L. ALFORD  2,059,188
CABLE GRIP LINK
Filed June 26, 1935  2 Sheets-Sheet 1

INVENTOR
E. L. ALFORD
BY
J. MacDonald
ATTORNEY

Nov. 3, 1936.   E. L. ALFORD   2,059,188
CABLE GRIP LINK
Filed June 26, 1935   2 Sheets-Sheet 2

INVENTOR
E. L. ALFORD
BY J. MacDonald
ATTORNEY

Patented Nov. 3, 1936

2,059,188

UNITED STATES PATENT OFFICE 2,059,188

CABLE GRIP LINK

Edward L. Alford, Union City, N. J., assignor to Bell Telephone Laboratories, Incorporated, New York, N. Y., a corporation of New York Application June 26, 1935, Serial No. 28,471

3 Claims. (Cl. 24—230.5)

This invention relates to cable grips and more particularly to split cable grips which are intended for use in pulling cables or holding cables under tension during splicing operations.

The object of the present invention is the provision of a split cable grip which may be applied and removed from the cable with a minimum amount of time and labor.

Another object of this invention is the provision of a novel type of hook, for securing the edges of the cable grip together, which has sufficient strength to withstand the stresses developed within the grip during the cable pulling operation.

Split cable grips consisting of interwoven strands have been extensively employed for pulling cables and for holding cables under tension, when it is not possible to use the regular tubular type of grip, due to the fact that the grip must be placed some distance from the end of the cable.

Heretofore it has been common practice to lace the edges of the grip together by means of leather thongs or secure them by means of C-shaped metal clips. In the case of the leather lacing it takes considerable time to lace the edges together and even then sufficient strength is not developed to hold the edges together.

The C-shaped metal clip was developed to overcome this fault of the leather lacing. However, while the metal clip has a distinct advantage over the lacing, it has the objection that after it has been applied and the cable pulled, it is extremely difficult to remove.

Applicant, realizing the shortcomings of the present type of split cable grips, has devised a split cable grip with a novel type of closing hook which is not only easy to apply, but after the cable has been pulled and the cable grip is distorted, the removal of the grip from the cable may be accomplished with little or no difficulty.

The invention, both as to its organization and method of operation, together with other objects and advantages thereof, will be further explained in the following detailed description having reference to the accompanying drawings consisting of the following figures.

Figure 1:
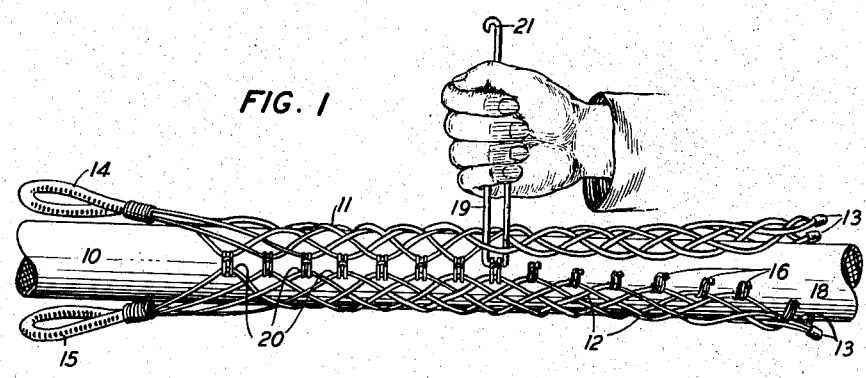
Fig. 1 is a plan view of the improved cable grip showing it in position about a cable and the first step of fastening it thereto.
Figure 5:
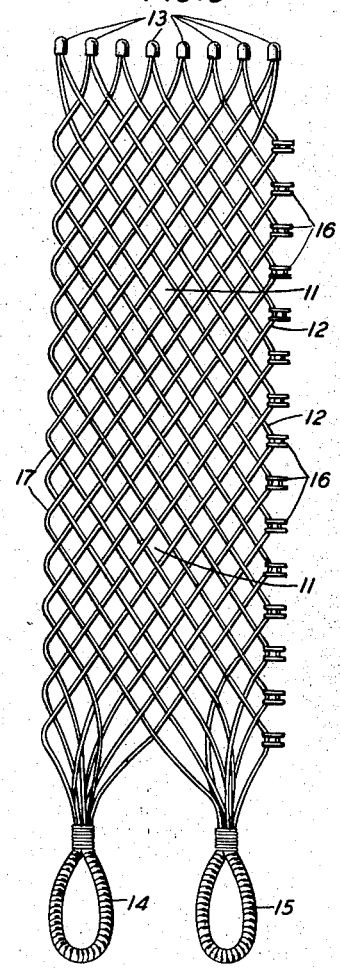
Fig. 5 is a view of the grip in extended position with the improved fastening hook secured to one edge thereof.

In the drawings, the reference character 10 represents a short section of cable of common form. The improved grip 11 comprises a body 12, which assumes a cylindrical form when applied to a cable and is composed of a plurality of interlaced strands 12. The body portion of the grip 11 constitutes a basket woven in the form of an enveloping sleeve, the strands 12 of which are inclined with respect to the axis of the body so that they pass in helices thereabout. At one extremity the strands 12 are attached together in pairs as indicated at the point 13 and at the opposite extremity the strands are united so as to form the loop portions 14 and 15 which are adapted to receive a suitable coupling devices so that a pulling force may be readily applied to the cable.

Figure 4:
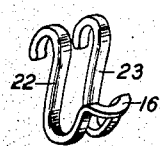
Fig. 4 is an enlarged view in perspective of the improved hook for fastening the longitudinal sides of the grip together.
Figure 7:
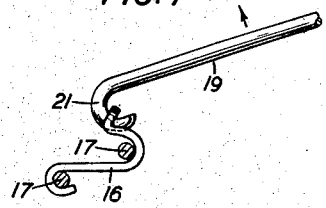
Figs. 7, 8, 9, 10 and 11 are fragmentary views illustrating how the tool shown in Fig. 6 is used to remove the loop from the hook.
Figure 8:
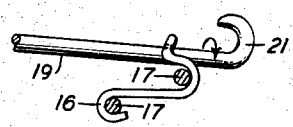

As shown in the drawings the body of the grip, which is composed of the previously mentioned interlaced strands 12, is not continuous, that is the body is split, so that the oppositely disposed longitudinal edges in the form of the loops 17 are formed with a space therebetween. A series of hook members 16, of the character illustrated in Fig. 4, are applied to the loops forming one longitudinal edge of the cable grip and are crimped thereover.

Figure 2:
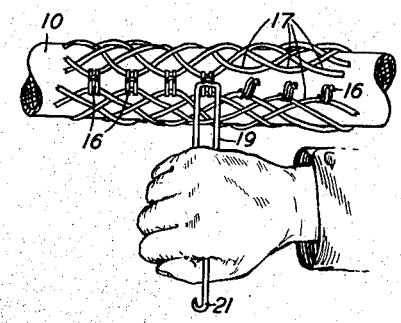
Fig. 2 is a view similar to Fig. 1 showing the second step required in completing the fastening operation.
Figure 6:
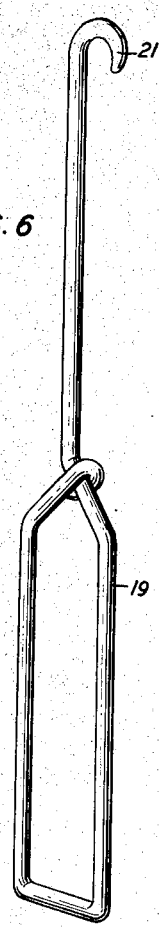
Fig. 6 illustrates a tool which may be used to manipulate the connecting hook in the operation thereof both for fastening and unfastening the hook.
Figure 9:
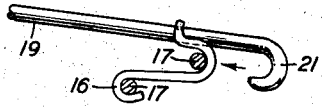
Figure 10:
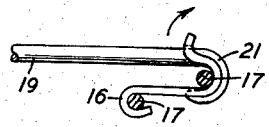
Figure 11:
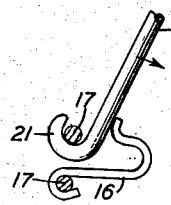

As shown in Fig. 1 the wide end of the tool 19, as shown in Fig. 6, is inserted through one of the loops 17 forming the opposite longitudinal edge of the cable grip and engages the upstanding portion of the open end of the hooks 16 and draws them under and over the loop to fasten or button the two edges together, as shown in Fig. 2. When the loops 17 are thus fastened by means of the hooks 16 the adjacent longitudinal edges of the split grip are firmly secured together as shown at 20.

By the method above described the diameter of the cable grip is reduced so that it conforms closely to the diameter of the cable. If a sliding force is exerted upon the grip, at the body thereof, the grip may be readily slid along the cable, but if a pulling force is exerted at the loops 14 and 15 the tensile force exerted in the strands 12 will have the effect of reducing the diameter of the body 11 of the grip and in this manner the grip will exert a firm grasp upon the cable.

Figure 3:
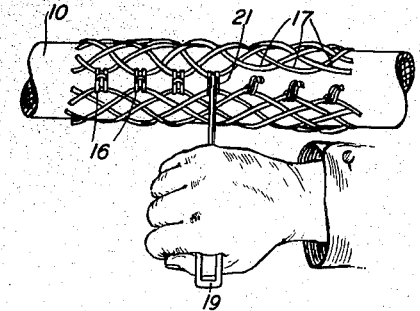
Fig. 3 is a view similar to Fig. 2, but illustrating the start of unfastening operation.

As shown in Fig. 3, the cable grip 11 may be readily removed from the cable 10 by inserting the end 21 of the tool 19 in between the portions 22 and 23 of the hook 16, grasping one of the loop portions 17 by means of the hook 21 and forcing this loop portion out from underneath the hook by using the upper portion of the closing hook 16 as a fulcrum thereby causing the loop 17 to disengage the hook 16 when the upper part or handle portion of the member 19 is forced backward. These steps are clearly shown in Figs. 7, 8, 9, 10 and 11.

The construction shown and described is particularly simple and efficient, both in construction and in operation, but obviously various changes may be made in the detailed construction without departing from the spirit of the invention and therefore I do not wish to limit the invention to the construction as shown and described but only to be limited by the appended claims.

What is claimed is:

1. A fastening means for linking adjacent edge portions of a loosely woven jacket comprising two parallelly spaced S-shaped hooks joined together at one end and having the point of joining of the ends of the S-shaped hooks turned outward from the hook portion.

2. A fastening means for linking adjacent edge portions of a loosely woven jacket comprising two parallelly spaced S-hooks connected at one end by an outwardly turned and bow-shaped portion adapted to form a fulcrum point for a tool.

3. A fastening means comprising a metal hook adapted to link adjacent edge portions of a woven jacket, said metal hook having two parallelly spaced S-shaped legs, a bar portion joining adjacent extremities of said legs and turned outwardly relative to said legs, and formed concave on its inner portion to accommodate a tool used in releasing an edge portion of the woven jacket from the fastening means.

EDWARD L. ALFORD.